(12) United States Patent
Sudo et al.

(10) Patent No.: US 6,625,202 B1
(45) Date of Patent: Sep. 23, 2003

(54) MOBILE STATION FOR SPREAD SPECTRUM COMMUNICATION

(75) Inventors: Shigeyuki Sudo, Yokohama (JP); Osamu Hikino, Fujisawa (JP); Kazutoshi Higuchi, Ibaraki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/352,360

(22) Filed: Jul. 13, 1999

(30) Foreign Application Priority Data

Jul. 13, 1998 (JP) .......................................... P10-196870

(51) Int. Cl.$^7$ ................................................ H04B 1/69
(52) U.S. Cl. ........................ 375/147; 375/130; 375/144; 370/342
(58) Field of Search ................................ 375/130, 140, 375/144, 147, 148; 370/342, 332, 335; 455/561; 333/193, 195; 327/165

(56) References Cited

U.S. PATENT DOCUMENTS 4,801,818 A * 1/1989 Schroedinger .............. 327/165
5,926,503 A * 7/1999 Kelton et al. ............... 375/148
5,970,084 A * 10/1999 Honda ........................ 375/147
6,229,840 B1 * 5/2001 Ichihara ...................... 375/147
6,370,397 B1 * 4/2002 Popovic et al. ............. 455/561

FOREIGN PATENT DOCUMENTS

JP          787057       3/1995
JP         7231278       8/1995

* cited by examiner

*Primary Examiner*—Shuwang Liu
(74) *Attorney, Agent, or Firm*—Antonelli, Terry, Stout & Kraus, LLP

(57) ABSTRACT

A mobile station for preventing reduction of the line quality when it is used near the head of a human operator. Plural antennas are arranged so that the cross-correlation of the received waves becomes small. The signals received by the antennas are delayed by a delay time to prevent interference between the received signals so that the time difference of each received signal becomes at least one chip time of the spreading code or more. After that, a combiner combines the received signals, and an output signal of the combiner is inputted into a rake receiver. A reduction of the extent of the delay spreading is prevented by directivity of the antennas in use near a human body, and a decline of path diversity gain by the rake receiving is reduced.

4 Claims, 4 Drawing Sheets

MOBILE STATION FOR SPREAD SPECTRUM COMMUNICATION

BACKGROUND OF THE INVENTION

The present invention relates to a technique wherein mobile stations communicate with other stations using spread spectrum communication; and, more particularly, the invention relates to mobile stations equipped with rake receiving circuits, such as digital portable telephones or mobile telephones of CDMA (Code Division Multiple Access) system.

For spread spectrum communication employed in a CDMA system, information signals are modulated by spectrum spreading using a spread code, which is called a pilot PN (Psuedo Noise) code, and the modulated signals are then transmitted from a base station. A mobile station, such as a portable telephone, reproduces the original information signal by demodulating the received signals using the same PN sequence which was used at the base station to de-spread the modulated information signals.

On the other hand, the radio waves, which are received at such a mobile station, are generally multipath waves, because the received waves are formed by a radio wave that has traveled via various routes after being reflected and diffracted by a building and other objects, for example. Such a multipath signal is characterized by a mutual interference between the phases of the waves forming the received signal, and this causes the problem of a reduction in the gain of a reduction in the ratio of received signal strength S and the magnitude of the noise N (S/N ratio).

To improve the S/N ratio in this type of system, a path diversity system using rake receiving is proposed in the Japanese patent Laid-open Publication 7-231278 official gazette. In such a system, several de-spreading circuits and demodulation circuits are provided according to the number of multipaths, and multipaths on which the propagation time is greater than the unit time of a spreading chip are decomposed, so that each de-spreading circuit performs de-spreading. That is, the multipath processing is assigned to several de-spreading circuits, and each de-spreading circuit performs de-spreading processing by using replica PN sequence codes for the phases that correspond to the assigned paths. Each demodulation circuit demodulates several input signals that are separated and de-spreading processed, and the demodulated input signals are combined after making the phases (time deviation) correspond to each other. Therefore, a received signal having a high gain is obtained. A set of these de-spreading circuits and demodulation circuits are referred to conventionally as a rake finger, and the number of the fingers are selected according to the spread of the delay profile on the radio path of the system.

Now, an antenna of a mobile station has directivity as a result of the blocking of radio waves by the body of the operator, because the receiver of a mobile station, such as a portable telephone or a mobile telephone, is used by putting the receiver against one's ear, that is, by holding the unit near the head of the operator.

As described in the Japanese patent Laid-open print No. 7-231278 official gazette, in case of rake receiving by de-spreading multipath signals which are decomposed to several paths, to obtain a high path diversity gain, it is assumed that the difference in the delay time of a receiving wave corresponding to the difference between path lengths is dispersed with a sufficient spread. That is, it is necessary to employ receive paths whose radio path lengths are greatly different, and for that, it is critical that waves that come from various different directions are received.

However, in case of using a receiver positioned near the head of the operator, the gain of the rake receiving cannot be high because the directions of the received waves are limited, and the extent of the delay spread of the received waves caused by the difference in the length of their paths is not sufficient. Thus, diversity systems are conventionally used in such a case. In a diversity system, spread spectrum signals are received by two antennas arranged so that the correlation between the received waves is almost zero, and the signal that has the higher receiving level is selected.

A diversity system for reducing the influence of the multipath effect and improve the S/N ratio is disclosed in the Japanese patent Laid-open print No. 7-87057 official gazette. In this system, one of the spread spectrum signals received by the two antennas is delayed and combined with another signal. That is, the spread spectrum signal received by one of the antennas is delayed for over one chip length (exp. four chip lengths), and the signals from the two antennas are combined to prevent interference by the two received signals. After the combined signals are de-spread, the de-spreaded signal and its delayed sinal that is delayed for said chip length are combined to obtain a high gain.

However, there is no specific disclosure of a way of delaying a high frequency signal. The delay time for several chips is several microseconds in the conventional system. When using a general delay line for delaying a high frequency signal, the delay line becomes very long to obtain a delay of several microseconds, and this becomes a problem in a mobile station in which miniaturization is required.

The object of the present invention is to avoid a reduction of the circuit quality (speech quality) when the mobile station of a spread spectrum communication system is located near the head of a human operator and avoid the need for an increase in the size of the mobile station.

SUMMARY OF THE INVENTION

The foregoing object of the present invention can be achieved in the following way.

A rake receiving circuit is provided in a mobile station using a spread spectrum communication technique. The rake receiving circuit separates a multipath signal which has been spread by spread spectrum modulation using a spreading code into several path signals whose propagation delay time is different using plural de-spreading means, demodulates each separated path signal, adjusts the time base of each demodulated path signal, and then combines the signals. Plural antennas are arranged so that the cross-correlation of a received wave becomes small. Signals received at these plural antennas are input and delayed by the delay means so that the time difference of each input signal is at least more than 1 chip time of the spreading code. Each signal outputted from the delay means is combined by a composing means. The output signal of this composing means is input to the rake receiving circuit.

By doing this, the signals received at the plural antennas are delayed for each received signal by a delay means, and the mutual time differences of each received signal are dispersed on the time base by more than 1 chip time of the spreading code. As a result, the correlation between signals received at each antenna becomes lower or zero by the delay dispersal to a time difference of more than 1 chip time of the spreading code.

Therefore, there is no damping or the signal amplitude by interference even if plural signals received by the respective antennas are simply added and combined at the high frequency level, and so delayed spreading signals suitable for a rake receiving circuit can be combined. Therefore, even if the mobile station is used near the head of a human operator, combined signals with a high diversity gain, which is a merit of the rake receiving, can be obtained, and a reduction of the line quality can be suppressed.

A well-known surface acoustic wave filter is used as a delay means. This filter converts a received signal into a surface acoustic wave signal, that is a mechanical vibration, and delays the signal. That is, in this case, the delay time of a spreading chip unit is very short, while it becomes a high magnitude, when a delay line is used. Thus, using the surface acoustic wave filter can miniaturize the delay circuit.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF PREFERRED EMBODIMENTS

Figure 1:
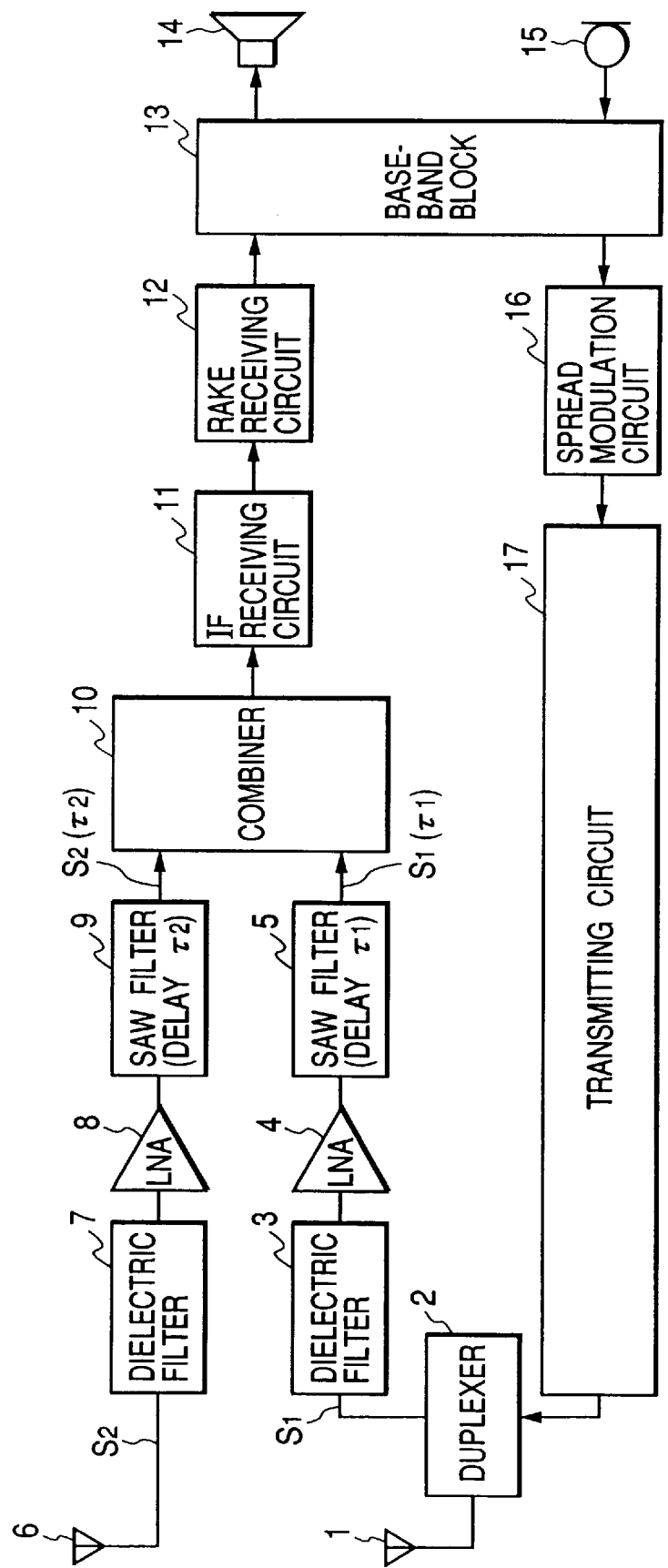
FIG. 1 is a block diagram of an example of a mobile station according to the present invention.

Various exemplary embodiments of the present invention will be explained with reference to the drawings. FIG. 1 is a block diagram of one embodiment of the mobile station according to the present invention.

As shown in FIG. 1, a built-in type receiving antenna 6, used exclusively for receiving signals, is provided in the mobile station in addition to the ordinary transmitting and receiving antenna 1. The transmitting and receiving antenna 1 is connected to a duplexer 2 that separates a transmission signal and a received signal. The received signal S1, picked-up by the transmitting and receiving antenna 1 are provided by the duplexer 2, and a received signal S2, picked-up by the built-in receiving antenna 6, are input into respective low noise amplifiers (LNA) 4 and 8 through filters 3 and 7, respectively.

The received signals S1 and S2 amplified by LNA 4 and 8 are input into surface acoustic wave (SAW) filters 5 and 9, respectively, and are delayed for predetermined delay times $\tau 1$, $\tau 2$, respectively. The delay signals S1 ($\tau 1$) and S2 ($\tau 2$) are input into a combiner 10 and are added and combined therein. This combiner 10 combines the signals in a high frequency state. The output of the combiner 10, which is at a high frequency, is input into an intermediate frequency (IF) receiving circuit 11, where it is frequency converted. After the frequency conversion, filter processing and magnification are carried out to obtain channel selectivity, and quadrature detection is effected to obtain a signal with a spreading range.

The signal with a spreading range obtained in the IF receiving circuit 11 is converted from analog to digital from and is input into a rake receiving circuit 12. In rake receiving circuit 12, the two received signals S1 ($\tau 1$) and S2 ($\tau 2$) with a delay time difference of ($\tau 1 - \tau 2$) are demodulated after being separated by a de-spreading means, and interpretation data is output to a baseband block 13 by combining the demodulated received signals. The baseband block 13 performs an error correction based on the interpretation data, and demodulates audio codes, which are output to an audio output 14.

On the other hand, in the baseband block 13, and audio signal supplied via an audio input 15 is audio coded and appended with an error correction code and then output to a spreading modulation circuit 16. In this spreading modulation circuit 16 an orthogonalization of a channel and a spread spectrum processing are performed, and the modulated signal to be transmitted is then output to a transmission circuit 17. The transmission circuit 17 performs power amplification after effecting carrier modulation, and outputs the amplified transmission signal to the duplexer 2. The transmitting and receiving antenna 1 transmits the signal supplied from the duplexer 2.

Now, the diagnostic characteristic of the present invention will be explained in detail. The mobile station according to this embodiment is a cellular portable telephone for use in a CDMA system, and is designed to obtain sufficient path diversity gain with rake receiving. An improvement of the S/N is achieved by arranging the transmitting and receiving antenna 1 and the built-in receiving antenna 6 is a relation whereby the correlation of the received signals becomes closer, and by combining the signals received via these two antennas through the rake receiving circuit 12.

In the conventional system, antenna combining, high frequency combining, IF combining and after detection combining, etc., are based on combining diversity according to the received signal levels. However, as the frequency range of the signal goes higher, it becomes difficult to control the combined phase precisely. That is, if the received signals to be combined are out of phase with each other, they will cancel each other, and the SN ratio gets disadvantageously lower. The combiner 10 if FIG. 1 is inserted as a reserve for rake receiving, and the adjustment or the control of the phase of a received signal is not performed in the combiner 10. Therefore, the two received signals are combined in the combiner 10 after adjusting the signals to a small correlation relative to each other by providing the SAW filters 5 and 9 so that the phases and modulation components of two high frequency received signals input into the combiner 10 become to have a small correlation relative to each other. These features will be explained with reference to the flow of signals in the system.

The signal received at the transmitting and receiving antenna 1 passes through duplexer 2 and is input into the dielectric filter 3 that passes a reception frequency band. The dielectric filter 3 performs a small loose zone restriction in the interpolated filter so as not to saturate the LNA 4 of the back step. The LNA 4 is an amplifier with a small noise factor, and is connected to apply an amplified signal into the SAW filter 5 that operates as a receiving band-pass filter. The signal received in the built-in receiving antenna 6 is input into the SAW filter 9 through the dielectric filter 7 and the LNA 8. The respective signals that pass through the two SAW filters 5 and 9 are input into the combiner 10.

The SAW filters 5 and 9 function as delay elements that apply different delay times to the respective input signals, as well as a receiving filter that has the same passband width. As shown in FIG. 1, in this system, the delay time of the SAW filter 9 is set at $\tau 1$, and the delay time of SAW filter 5 is set at $\tau 2$. 1t is necessary to set the time different between the delay times $\tau 1$ and $\tau 2$ as follows so that the outputs of the SAW filters 5 and 9 can be handled as a small correlation for the phases and the modulation components.

That is, in the case of the CDMA system, if the two received signals deviate by more than the spreading chip time, it can be handled as a small correlation for the phases and the modulation components. In case of a representative system, the spreading chip time should be about 814 nanoseconds, because the spreading rate is 1.2288 megachip/second.

Figure 2A:
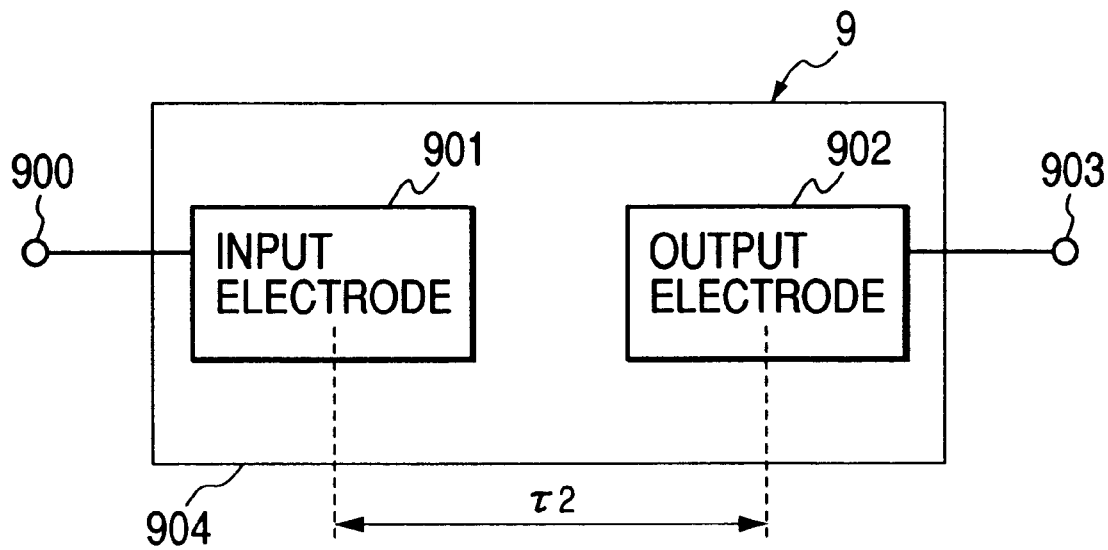
FIGS. 2A and 2B are block diagrams of examples of delay means as used in the mobile station of FIG. 1.
Figure 2B:
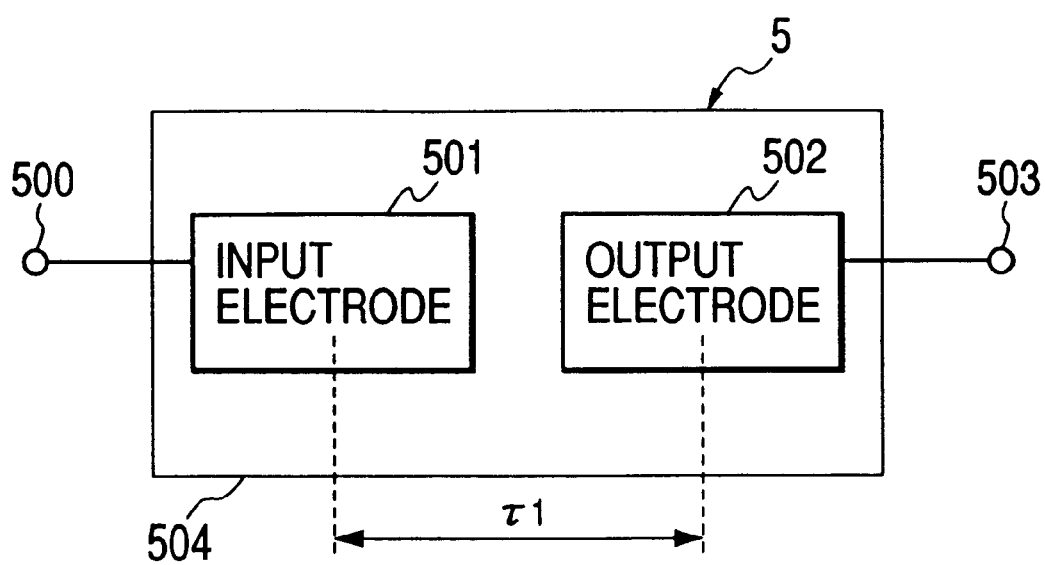

On the other hand, if a delay line is used, the delay line becomes huge in the case of providing a delay time in the order of a microsecond, like mentioned above, to a high frequency signals. At this point, a SAW filter may be used as a small sized delay means, because it provides a delay by first converting a signal into a sound speed wave. Such a SAW filter will be explained with reference to FIG. 2A and FIG. 2B. FIG. 2A shows the components of SAW filter 9, and FIG. 2B shows the components the SAW filter 5. Reference numerals 900 and 500 denote input terminals. Reference numerals 901 and 501 denote input electrodes. Reference numerals 902 and 502 denote output electrodes. Reference numerals 903 and 503 denote output terminals. Reference numerals 904 and 504 denote piezoelectric substrates. In the SAW filters 5 and 9, a voltage signal applied to input electrode 901 (or 501) is converted into an acoustic wave signal, and the translated acoustic wave spreads to the output electrode 902 (or 502). After that, the acoustic wave signal is converted into a voltage signal at the output electrode 902 (or 502).

The transfer functions of the SAW filter 5 and 9 are determined by the impulse response of the pattern of the input electrode 901 (or 501) and the folding of the impulse response of the pattern of the output electrode 902 (or 502). And, the delay time is determined by the time needed for propagating a distortion on the surface of the piezoelectric substrate 904 (or 504) to the output electrode 902 (or 502). The distortion is caused by the electrical signal applied to the input electrode 901 (or 501). In case the piezoelectric substrate 904 (or 504) is a crystal, this value of the sound speed is about 3000 meters per second. Therefore, the difference of about 3-millimeter in physical length should be adopted to get a delay time in the order of a microsecond. In this example, a delay time of several times the spreading chip time length is provided. The delay times $\tau 1$ and $\tau 2$ are adjusted by adjusting the center-to-center dimension of the input electrode 901 (or 501) and the output electrode 902 (or 502).

The signals S1 ($\tau 1$) and S2 ($\tau 2$) delayed by the SAW filters 5 and 9 can be combined without interference if they are combined by simply adding them with an impedance matching using the combiner 10, because the received signals have a time difference which is greater than the spreading chip time ($\tau 1 - \tau 2$). The output of combiner 10 is converted into the signal {S1' ($\tau 1$) S2' ($\tau 2$)} of a spreading range in the IF receiving circuit 11, and also is subjected to analog/digital conversion, and then, is inputted into the rake receiving circuit 12. After separating the two received signals S1' ($\tau 1$) S2' ($\tau 2$) with the delay time difference ($\tau 1 - \tau 2$) by de-spreading, the rake receiving circuit 12 demodulates them and combines the demodulated signals, and then the interpretation data is output to the baseband block 13, as described previously.

Now, an example of the constitution of the rake receiving circuit 12 will be descried in further detail as follows. First, in the mobile station of the CDMA system, it is basically necessary to effect demodulation of an original signal by de-spreading the signal that was previously spread by-spread spectrum processing, as received from the base station. Therefore, the synchronous processing of a pilot PN sequence is necessary for matching the phase of a pilot PN sequence that represents a spreading code with the base station side during the de-spreading process. This synchronous processing is divided into two levels consisting of a synchronous acquirement and a synchronous retention. The synchronous acquirement is generally based on a correlative operation. The process on this level involves shifting a replica PN sequence on every spreading chip as a unit and multiplying the code with the received signal, and then judging whether its integral value is more than a threshold value. In case the replica PN sequence and the PN sequence on the base station side are not synchronized, the search is continued by changing the phase of the replica PN sequence. Its integral range is one symbol interval of digital phase modulation, for example, and the number of spreading chips per one symbol is the value obtained as a process gain. For example, it is 64 in the representative CDMA system. Also, speed-up of an initial acquirement is required for searching this topological space because the length of the code of a pilot PN sequence is 32768, that is, the 15th power of 2. On the other hand, the synchronous retention is a process of maintaining the synchronism in the phase in the chip after acquiring spreading chip synchronism.

Figure 3:
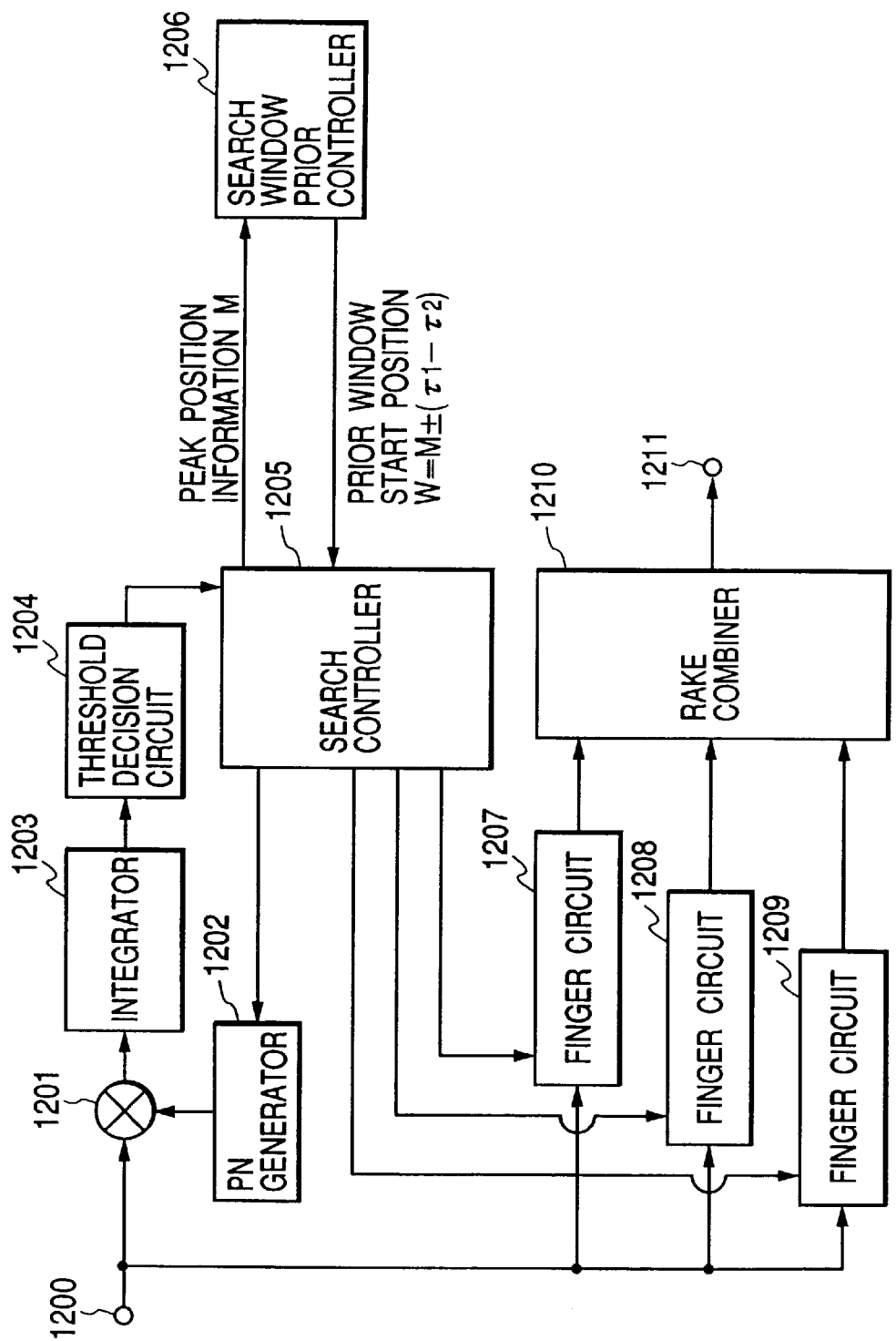
FIG. 3 is a block diagram of a rake receiving circuit in the mobile station of FIG. 1.

FIG. 3 is a block diagram of rake receiving circuit 12 in the example shown in FIG. 1. As shown in the figure, the received signal {S1' ($\tau 1$ S2' ($\tau 2$)} of a spreading zone that is processed in the 1F receiving circuit 11 is input to input terminal 1200, and the replica PN sequence for a de-spreading output from a PN sequence generation circuit 1202 is multiplied in a multiplier 1201 and the result is input into an integrator 1203. The integrator 1203 integrates the output of the multiplier 1201 for a predetermined period (for example one symbol time), and outputs the result to a threshold value interpretation circuit 1204. The threshold value interpretation circuit 1204 detects a peak which is larger than a predetermined threshold value from the output of the integrator 1203, and outputs the detected peak position information and the peak value to a search controlling circuit 1205. That is, the threshold value interpretation circuit 1204 is able to detect a path by detecting the peak value and outputting the detected peak position information and the peak value to the search controlling circuit 1205, because the peak appears in the output of the integrator 1203 when the spreading code and the replica PN sequence of the received signal are synchronized.

The search controlling circuit 1205 performs a path search by controlling the phase of the replica PN sequence generated from the PN generation circuit 1202 on the basis of the above-described detection information. That is, the phase of a replica PN sequence is changed until the threshold value interpretation circuit 1204 detects a peak value. At the time of starting an initial search, the search controlling circuit 1205 outputs the peak position information M found in the first place to the search window priority controlling circuit 1206, and when all specified search ranges have been searched, the maximum peak position information M is output to the search window priority controlling circuit 1206.

The second window priority controlling circuit 1206 calculates M±($\tau 1 - \tau 2$) from the peak position information M, and outputs it as start position information W of the time window to be searched to the search controlling circuit 1205. Therefore, in case the peak position detected by the search controlling circuit 1205 corresponds to the path received by the antenna 1 (or 6), the search controlling circuit 1205 can search the path received by the other antenna 6 (or 1) prior to searching the path received by the antenna 1 (or 6).

Therefore, the synchronism of the path of the other propagation can be promptly acquired by detection of synchronism of one path. Well-known methods (for example, as described in the Japanese patent Laid-open print No. 9-83429 official gazette) can be applied as the method of searching the inside of a topological space by a time window search.

Simultaneously with the above, the search controlling circuit 1205 specifies the phase of the PN sequence of the signal to be tracked to each finger circuit 1207–1209. And, the search controlling circuit 1205 operates to assign a path searched on the basis of start position information W of the time window to at least one of the finger circuits 1207–1209.

As described above, the diagnostic characteristic of the rake receiving circuit 12 of this example is that the search window priority controlling circuit 1206 is employed. The search window priority controlling circuit 1206 provides the time window information for a search by detecting the position of the maximum peak in the information provided by the search controlling circuit 1205 and the delay time difference ($\tau 1-\tau 2$) given in the SAW filters 5 and 9. That is, at the time of the initial search, a path acquirement can be speeded-up because there is a high probability that another path will be found in a position having a relative delay time difference of ($\tau 1-\tau 2$) if one path is found.

As described above, the finger circuits 1207–1209 process de-spreading and demodulation of the received signals corresponding to a respective path, and output demodulated signals to a rake combiner circuit 1210. The rake combiner circuit 1210 combines signals by adjusting the skew of each finger circuit 1207–1209, and interprets the data, so as to provide an output to an output terminal 1211. The skew can be presumed from the phase relationship between each code.

According to the example described above, at least two multipath signals obtained at two small correlative antennas 1 and 6 are processed to form non-correlative received signals S1 ($\tau 1$) S2 ($\tau 2$) by employing a delay time that is separable by a de-spreading means, and the signal that is generated by adding and combining the non-correlative received signals is input to the rake receiving circuit 12. Therefore, a diversity gain is stably obtained compared with the conventional method in which the diversity gain is reduced by the influence of the head of a human operator or another part of the human body.

It is easy to apply the features of the present invention to a portable telephone for which miniaturization is required because the delay time difference is provided by the small SAW filters 5 and 9. Moreover, it is suitable for miniaturization because it operates in one line of the 1F receiving circuit by providing the delay time $\tau 1, \tau 2$ in a high frequency signal range.

The rake receiving circuit 12 can acquire a path at high speed especially and combine the received output of the antenna 1 and the antenna 6 from the multipath signals with high probability by providing the search window priority specification circuit 1206.

Acquirement of plural effective multipaths does not always means that the path from the two antennas 1 and 6 is combined, however, it means that the number of effective paths is increased and stable diversity gain in the rake receiving is obtained. Therefore, it is important to increase the number of effective paths on the input side of the rake receiving circuit 12, as provided in the above example.

Figure 4:
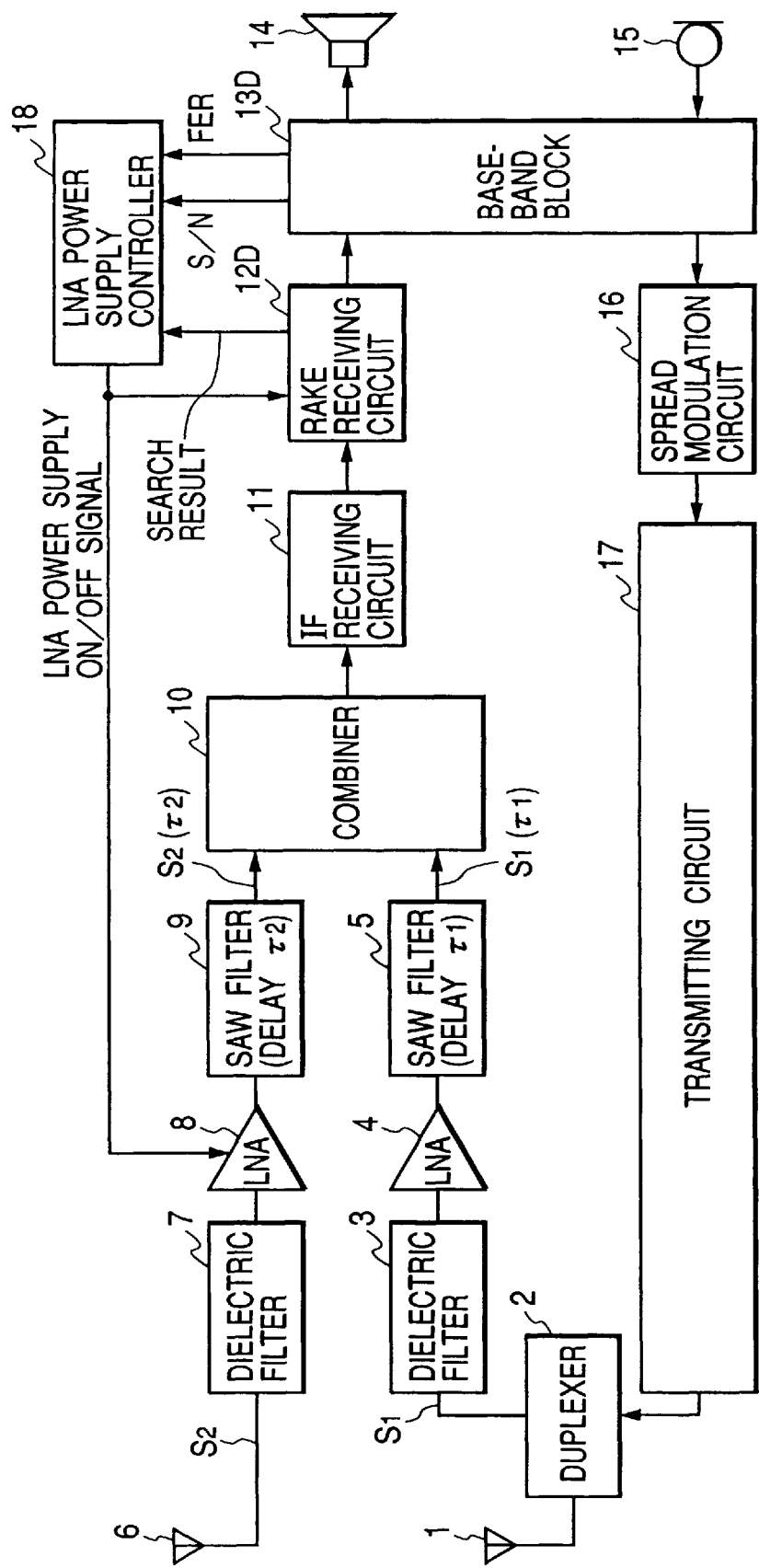
FIG. 4 is a block diagram of another example of a mobile station according to the present invention.

In FIG. 4, a block diagram of another example of the mobile station of the present invention is shown. This embodiment is basically different from the example described with reference to FIG. 1 in that a LNA power supply controller 18 is additionally provided and in that a modification was made to the rake receiving circuit 12D and the baseband block 13D, as will be described below.

First, the rake receiving circuit 12D outputs the amplitude information of the combined signal to the baseband block 13D. The baseband block 13D estimates the S/N ratio of the received signal from a means value and a dispersal value in the amplitude information, and outputs it to the LNA power supply controller 18. Also, the baseband block 13D processes error correction using amplitude information, for example, a viterbi algorithm using a soft decision value, and error detection using a cyclic redundancy code (CRC), and outputs a frame error rate (FER) in the predetermined period to the LNA power supply controller 18. The LNA power supply controller 18 interprets the line quality from the S/N ratio and the frame error rate (FER) and controls the power supply to the LNA 8 connected to built-in antenna 6.

The control operation of this LNA power supply controller 18 contains the first operation and second operation described in the following example. In the first operation, the controller 18 turn on the power source of the LNA 8 for reducing power consumption of the mobile station in case the line quality is less than the reference value of a lower limit during a call, and turns off the power source of the LNA 8 simultaneously with an end of a call. The system is the same as the simple arrangement with the transmitting and receiving share antenna 1 only during the time the power source of the LNA 8 is turned off. As a result, the electric current consumed in LNA 8 is reduced if the line quality is favorable with use of the one antenna 1 only.

In the second operation, the controller 18 turns off the power source of the LNA 8 even through the power supply to the LNA 8 is turned on, when an improvement of the line quality is not expected, and further prohibits the first operation for a predetermined time period. The LNA power source on/off signal also is output to the rake receiving circuit 12D for executing the second operation. That is, the rake receiving circuit 12D starts the multipath search operation when it is detected that the power supply of the LNA 8 is turned on. The rake receiving circuit 12D informs the LNA power supply controller 18 whether it succeeded or failed in the acquirement of a new influential path by this search operation. The LNA power supply controller 18 judges that the improvement of the line quality is not to be expected if it does not receive a notice that indicates a success in the acquirement of a path in a predetermined time period from the rake receiving circuit 12D.

That is, the second operation is effective for avoiding a weakness of the signal received through the transmitting and receiving antenna 1 caused by the path signal through the newly added built-in antenna 6. In this case, the two signals arrive in the same chip time including the delay time due to the SAW filters 5 and 9, and have antiphase carriers. However, this possibility is low in the practice.

According to this example, in case a new path is not found, other than the position of the path that was acquired before, the signal which is the cause of a degradation is damped because the power supply of LNA 8 is turned off.

The LNA power supply controller 18, which functions as a line controller, can input the received signal of built-in antenna 6 into combiner 10 in case improvement of the line quality is expected, and the consumption of electric power of the LNA 8 can be reduced in case it is not necessary.

According to the present invention, as described above, a plurality of received signals coming from different directions are acquired by using plural antennas that have a small correlation in directivity even in the case a mobile station used near the head of an operator. Also, because the plurality of received signals are combined and added by a combiner after a delay that provides a delay time difference such that the phase component and modulation component are in close correlation so that the signals may be separated by the de-spreader of the rake receiving circuit, the decrease of the independent number of paths that is necessary to obtain diversity gain can be prevented, and a stable receiving gain can be obtained.

We claim:

1. A mobile station for spread spectrum communication, comprising:

a plurality of antennas arranged so that a cross-correlation of signals received thereby is small;

a delay device, to which received signals from said antennas are input, for delaying the received signals so that the time differences of each of the received signals are more than one chip time of the spreading code;

a high frequency combining circuit for combining each of the received signals output from the delay device; and a rake receiving circuit for receiving a combined signal output by said high frequency combining circuit, said combined signal being a multipath signal, separating said multipath signal using a plurality of de-spreading circuits into a plurality of path signals each having a different propagation delay time, said multipath signal being spread by a spread spectrum method according to a spreading code, demodulating each of the separated path signals, and combining the demodulated path signals by adjusting the time base of the demodulated path signals, wherein said delay device is a surface acoustic wave filter, which delays a received signal by converting the received signal to a surface acoustic wave signal consisting of a mechanical vibration, wherein said rake receiving circuit comprises:

a path search circuit that processes de-spreading of the combined signal output from said high frequency combining circuit by using a reference spreading code, searches for the peak value of the path, wherein the amplitude of the de-spreaded signal is more than a threshold value, by controlling the phase of the reference spreading code, and finds time position and amplitude value of the peak, and a time window instruction circuit that finds the maximum peak wherein the amplitude value of the peak output from the path search circuit is the maximum, determines a time window of the peak search in the path search circuit according to the time position of the maximum peak while taking account of a time difference of a delay in said delay device, and identifies the time window to the path search circuit.

2. A mobile station for spread spectrum communication, comprising:

a plurality of antennas arranged so that a cross-correlation of signals received thereby is small;

a delay device, to which received signals from said antennas are input, for delaying the received signals so that the time differences of each of the received signals are more than one chip time of the spreading code;

a high frequency combining circuit for combining each of the received signals output from the delay device;

a rake receiving circuit for receiving a combined signal output by said high frequency combining circuit, said combined signal being a multipath signal, separating said multipath signal using a plurality of de-spreading circuits into a plurality of path signals each having a different propagation delay time, said multipath signal being spread by a spread spectrum method according to a spreading code, demodulating each of the separated path signals, and combining the demodulated path signals by adjusting the time base of the demodulated path signals;

a line controller that evaluates a line quality from a signal output from said rake receiving circuit, and attenuates several of the signals received by said antennas according to an evaluation before processing of the received signals in said high frequency combining circuit; and an amplifier that amplifies the received signals from said antennas, wherein the output of the amplifier is input to a surface acoustic wave filter, and said line controller controls a power supply of the amplifier according to evaluation of the line quality.

3. A mobile station according to claim 2, wherein said line controller controls power on and power off operation of a power supply of said rake receiving circuit, and said rake receiving circuit starts to acquire new paths and informs a result of an acquirement to the line controller when the power supply of said rake receiving circuit is on, and the line controller shuts off the power supply of to said rake receiving circuit in case a failure of the acquirement is detected.

4. A mobile station for spread spectrum communication, comprising:

a plurality of antennas arranged so that a cross-correlation of signals received thereby is small;

a delay device, to which received signals from said antennas are input, for delaying the received signals so that the time differences of each of the received signals are more than one chip time of the spreading code;

a high frequency combining circuit for combining each of the received signals output from the delay device; and a rake receiving circuit for receiving a combined signal output by said high frequency combining circuit, said combined signal being a multipath signal, separating said multipath signal using a plurality of de-spreading circuits into a plurality of path signals each having a different propagation delay time, said multipath signal being spread by a spread spectrum method according to a spreading code, demodulating each of the separated path signals, and combining the demodulated path signals by adjusting the time base of the demodulated path signals, wherein said delay device is a surface acoustic wave filter, which delays a received signal by converting the received signal to a surface acoustic wave signal consisting of a mechanical vibration, wherein said rake receiving circuit comprises:

path search means that processes de-spreading of the combined signal output from said high frequency combining means by using a reference spreading code, searches for the peak value of the path, wherein an amplitude of a de-spreaded combined signal is more than a threshold value, by controlling a phase of a reference spreading code, and finds a time position and amplitude value of the peak, and a time window instruction means that finds the maximum peak wherein said amplitude value of the peak output from the path search means is the maximum, determines the time window of the peak search in the path search means according to the time position of the maximum peak while taking account of a time difference of a delay in said delay device, and identifies a time window to the path search means.

* * * * *